United States Patent [19]

Inoue

[11] Patent Number: 4,851,102
[45] Date of Patent: Jul. 25, 1989

[54] ELECTRODEPOSITION COATING SYSTEM

[75] Inventor: Akito Inoue, Tachikawa, Japan

[73] Assignee: Poly Techs Inc., Tokyo, Japan

[21] Appl. No.: 127,044

[22] Filed: Nov. 27, 1987

[30] Foreign Application Priority Data

Aug. 12, 1987 [JP] Japan .................................. 62-210553
Aug. 12, 1987 [JP] Japan .................................. 62-201554

[51] Int. Cl.⁴ ............................................. C25D 13/00
[52] U.S. Cl. ...................... 204/299 EC; 204/300 EC
[58] Field of Search .................. 204/300 EC, 299 EC, 204/180.2, 180.9

[56] References Cited

U.S. PATENT DOCUMENTS

| 4,284,493 | 8/1981 | Case | 204/299 EC |
| 4,486,284 | 12/1984 | Mori et al. | 204/300 EC |
| 4,663,014 | 5/1981 | Bassett | 204/299 EC |
| 4,711,709 | 12/1987 | Inoue | 204/299 EC |

FOREIGN PATENT DOCUMENTS

| 2531902 | 10/1977 | Fed. Rep. of Germany ...... 204/299 EC |
| 2936061 | 3/1981 | Fed. Rep. of Germany . |
| 57-027955 | 6/1982 | Japan . |
| 57-096972 | 6/1982 | Japan . |
| 58-184566 | 12/1983 | Japan . |
| 61-004531 | 2/1986 | Japan . |
| 61-199574 | 12/1986 | Japan . |
| 61-272397 | 12/1986 | Japan . |
| 61-272398 | 12/1986 | Japan . |
| 1203789 | 9/1970 | United Kingdom ......... 204/300 EC |

OTHER PUBLICATIONS

Metal Finishing, G. E. F. Brewer, Sep. 1980, pp. 55-59.
Patent Abstracts of Japan, vol. 10, No. 362(C-389)(2419), 4th Dec. 1986; & JP-A-61 157 698 (Daihatsu Motor Co., Ltd) 17-07-1986.
Patent Abstracts of Japan, vol. 11, No. 8 (C-396) (2455), 9th Jan. 1987; & JP-A-61 183 499 (Kansai Paint Co., Ltd), 16-08-1986.
Siemens Power Engineering, vol. 5, No. 2, Mar./Apr. 1983, pp. 68-73, Passau, Ger.; K. Matheis: "Power Supply System for a Cathodic Electro-Coating Plant".

Primary Examiner—John F. Niebling
Assistant Examiner—Ben C. Hsing
Attorney, Agent, or Firm—Sandler & Greenblum

[57] ABSTRACT

This invention relates to an electrodeposition coating system, wherein an article to be coated as being an electrode on one side and a plurality of membrane electrodes as being electrodes on the other side are provided in one and the same bath. Voltage supply to at least part of the membrane electrodes are made switchable or the voltage is made variable to a desirable value. Voltage regulation and the like to the membrane electrodes are possible in accordance with the shape of the article to be coated, so that a uniform coating surface can be formed on the article to be coated.

19 Claims, 16 Drawing Sheets

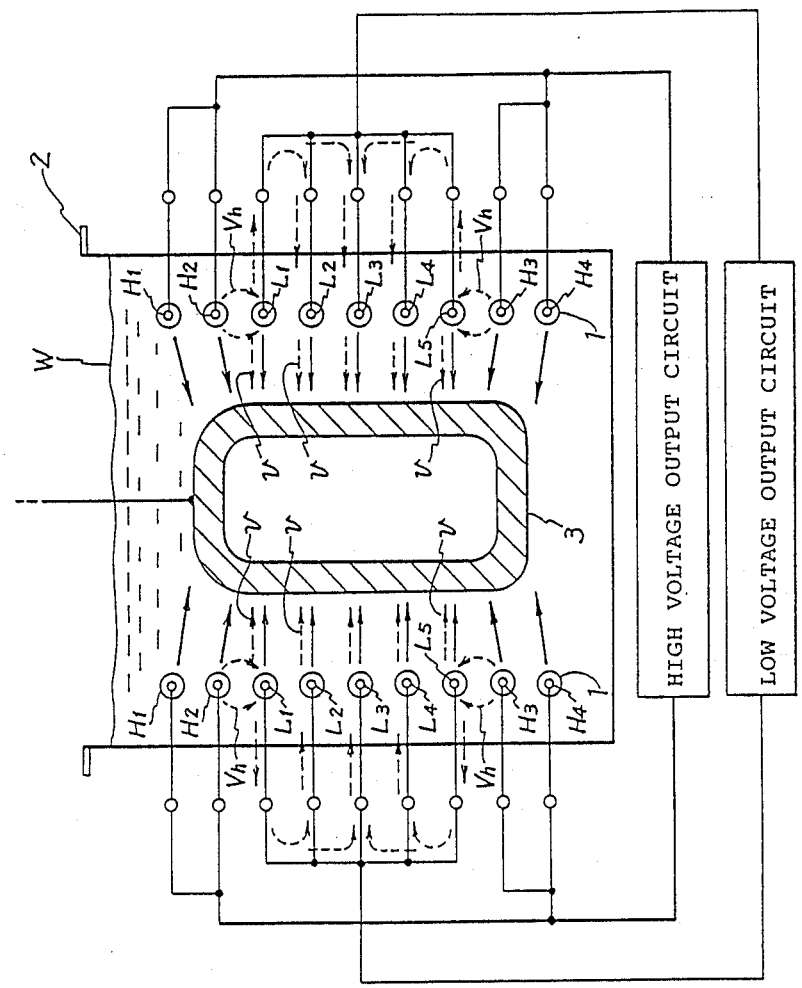

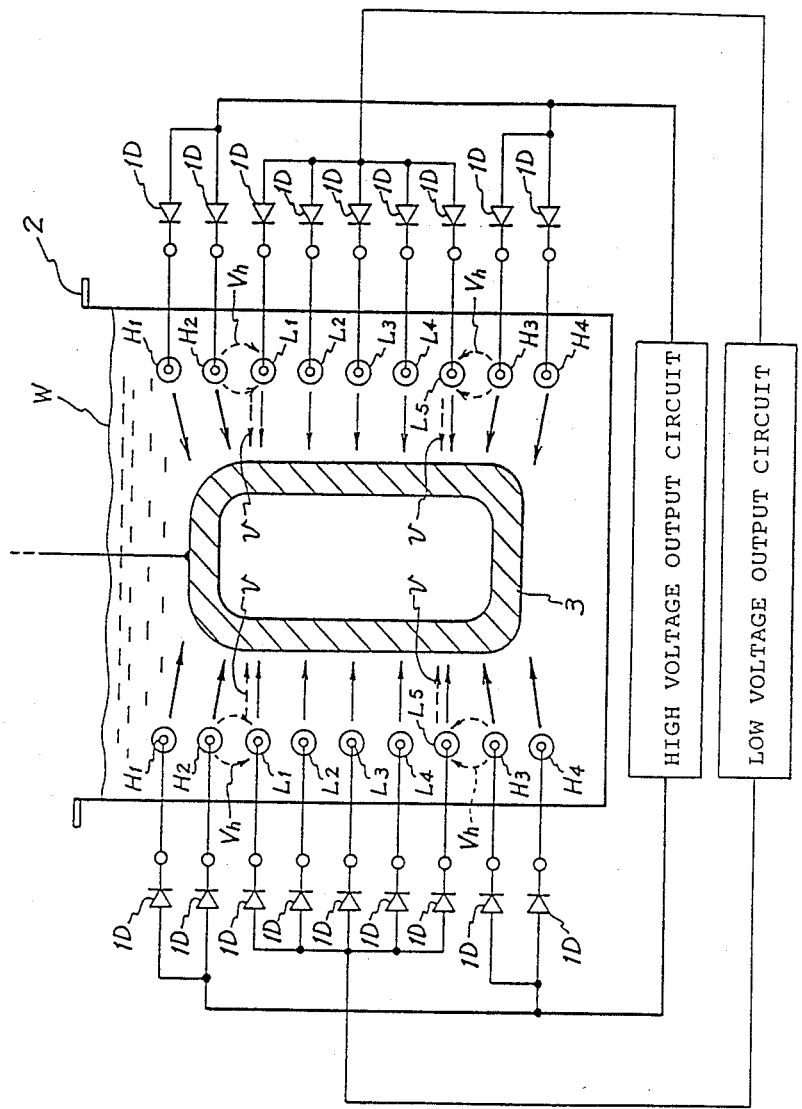

FIG.16 (1)
PRIOR ART
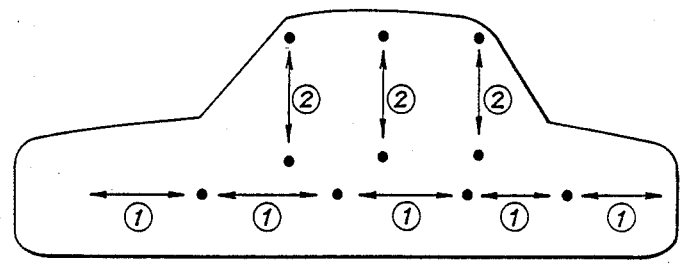
FIG.16 (2)
PRIOR ART
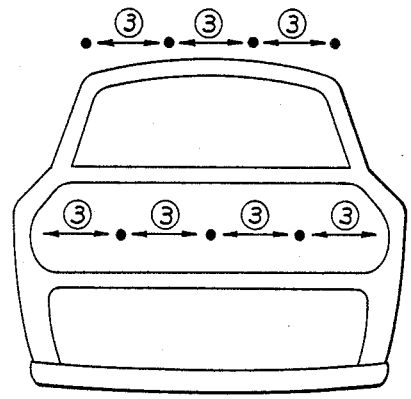

ELECTRODEPOSITION COATING SYSTEM

BACKGROUND OF THE INVENTION

1. Field of the Invention

This invention relates to electrodeposition coating systems, and more particularly to an electrodeposition coating system using a plurality of membrane electrodes.

2. Description of the Prior Art

In the electrodeposition coating, uniformity and adhesion of the coating film on an article are excellent, automatization and labor-saving can be effected easily and the degree of causing pollution is low, whereby, there have been widely applied to the coating film treatment of motor vehicle bodies and so forth for example, particularly as suitable ones in the prime coating or one coat finishing for the coating of metal materials. Coating materials used in the electrodeposition coating are broadly divided into two including an anion type coating material having an acid radical as a resin of basic composition (carboxyl group for example) and a cation type coating material having a base as a resin of basic composition (amine group for example). Either one, solely used, is very low in solubility in the water. Because of this, there have been used such ones that, in the case of the anion type coating material, an alkaline neutralizing agent such for example as triethylamine is mixed thereinto, while, in the case of the cation type coating material, an acidic neutralizing agent such as acetic acid is mixed thereinto, whereby the both coating materials are neutralized to form salts, so that the solubility in the water is raised.

The neutralizing agents are mixed in accordance with the properties of the resin components of the respective coating materials as described above. However, as the electrodeposition treatment of the article to be coated advances, the resin component in an aqueous solution decreases, whereby the coating material should be supplied from the outside. In this case, in the aforesaid aqueous solution, there is accumulated amine or acetic acid as the neutralizing agent and pH is gradually changed, and a phenomenon such as redissolving of the coated surface or occurrence of pin holes is generated. Because of this, recently, a so-called pH control is carried out to achieve the actual effect such that the electrodes on one side are separated from the article to be coated as being the other electrode by a membrane, and amine or acetic acid is electrically and osmotically extracted from the aqueous solution, to thereby prevent the neutralizing agent from increasing in the aqueous solution.

On the other hand, in order to raise the durability of the above-described membrane, the inventor of the present invention proposed tubular membrane electrodes as being a new system, wherein the membrane are formed into tubular shapes for use, and actually installed and was working it as a standing type.

However, in the electrodeposition coating, the outer surface of the article to be coated as a whole need not necessarily be uniformly coated. For example, such a disadvantage is presented that the thickness of the coating film may be thin on the inner side, the top surface or the under surface to a considerable extent. FIGS. 16(1) and 16(2) show the specific examples thereof. These FIGS. 16(1) and 16(2) show comparison of attached quantities of the coating film in the case where the electrodeposition coating is carried out on the motor vehicle body by the conventional technique. In FIGS. 16(1) and 16(2), indicated by (1), (2) and (3) are directions, respectively. In these FIGS. 16(1) and 16(2), in the directions (1), the thickness of the coating film on one and the same line, are generally uniform. In contrast thereto, in the directions (2) and (3), such a disadvantage is presented that, the more distant the coating film becomes, the thinner the coating film becomes sharply.

Restating the above, when coating a large article, such as a motor vehicle body, in an electrodeposition system, distance of the article to be coated from membrane electrodes tends to vary in the vertical direction (the direction indicated by double-headed arrows 2 in FIG. 16 (1)) rather than in the horizontal direction (the direction indicated by double headed arrows 1 in FIG. 16 (1)). Thus, systems which do not allow for control of voltage applied to membrane electrodes in the vertical direction cannot effectively uniformly coat such articles. For example, it is known to arrange membrane electrodes vertically. Such an arrangement is shown in FIG. 2 of DEOS No. 2,531,902. Further, it is known to apply different voltages to various groups of membrane electrodes. However, it is simply not possible with such arrangements to create a variable potential field in the vertical direction. It is only possible with such arrangements to create variable potential fields in the horizontal direction, in which direction, as stated above, it is generally not necessary to vary potential field strength.

And, in this case, if the electrodeposition coating is carried as referenced from a portion where the coating film is thin, such a disadvantage is presented that the thicknesses of the coating film on the both side surfaces opposed to the tubular membrane electrodes as being the electrodes on the other side become considerably large, so that disadvantageously increased consumption of the coating material leads to uneconomics, thus increasing the manufacturing cost.

SUMMARY OF THE INVENTION

The present invention has been developed to obviate the above-described disadvantages of the conventional examples and has as its object the provision of an electrodeposition coating system capable of forming a coating film on outer peripheral surfaces of the article to be coated relatively uniformly.

To achieve the above-described object, the present invention contemplates in an electrodeposition coating system provided with a plurality of membrane electrodes as being the electrodes on one side in association with an article to be coated as being the electrode on the other side in one and the same bath, wherein the respective membrane electrodes are position ally adjustably arranged in a direction of transferring the article to be coated, and part or the whole of the membrane electrodes are additionally provided with power on-off means for releasing the membrane electrodes from a power circuit as necessary or the membrane electrodes are additionally provided with output voltage regulating means capable of variably setting a voltage applied to each of the membrane electrodes to a desirable value.

BRIEF DESCRIPTION OF THE DRAWINGS

FIGS. 9(1) and 9(2) are explanatory views showing actions of the non-return diode in FIG. 8;

FIGS. 16(1) and 16(2) are explanatory views showing the results of the electrodeposition coating carried out by the conventional technique.

DETAILED DESCRIPTION OF THE EMBODIMENTS

One embodiment of the first aspect of the present invention will hereunder be described with reference to the drawings.

Figure 1:
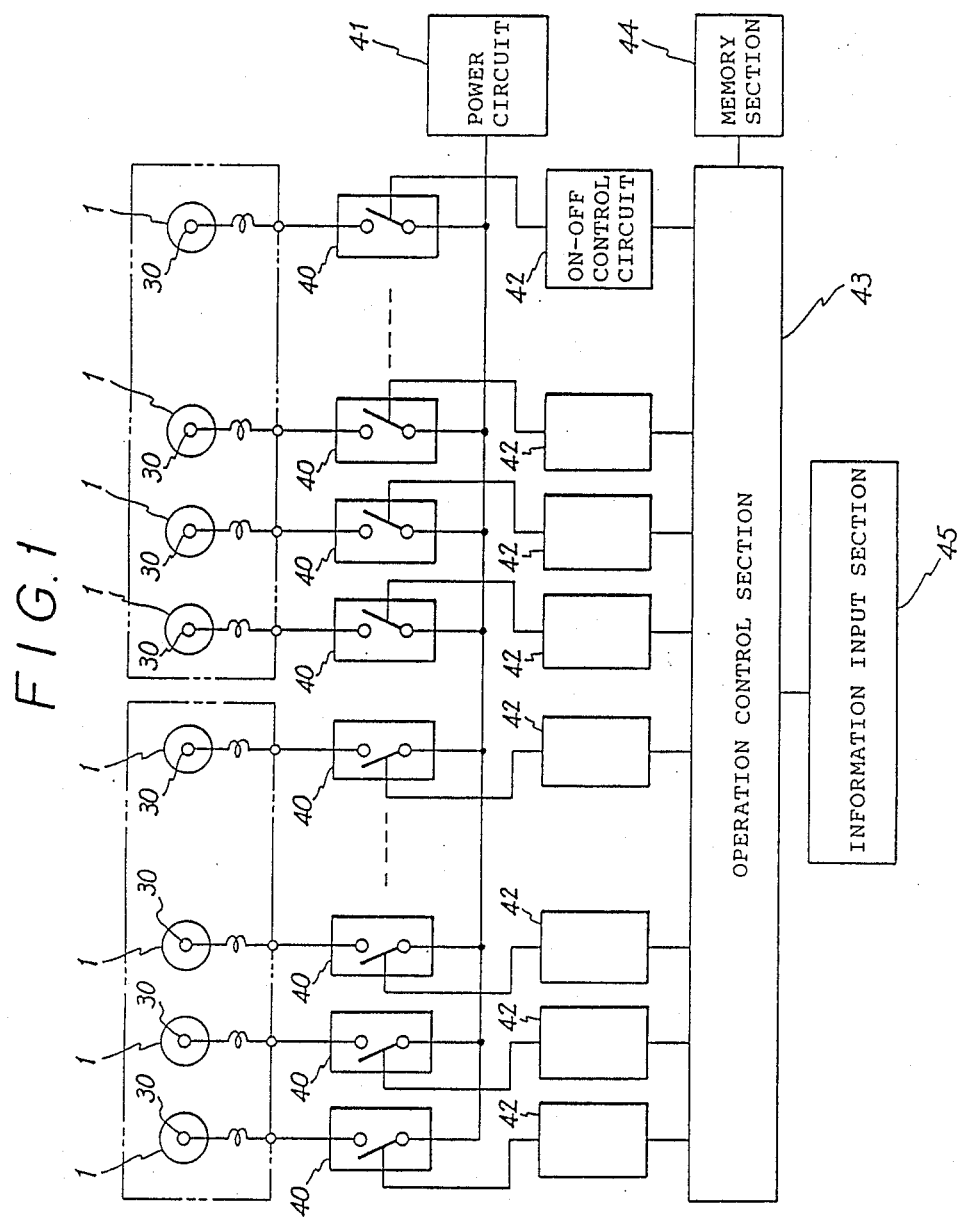
FIG. 1 is a block diagram showing one embodiment of a first aspect of the present invention.
Figure 2:
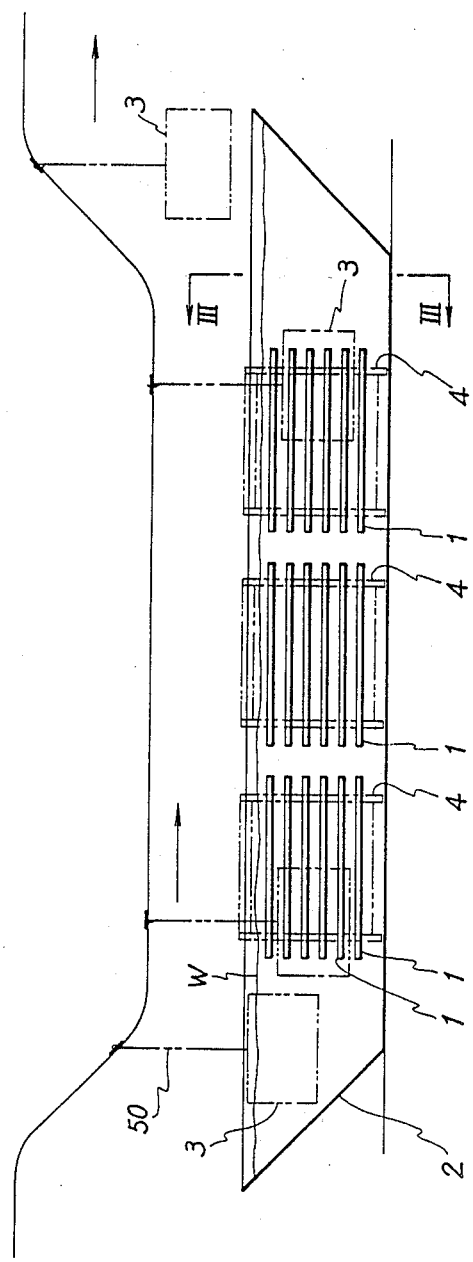
FIG. 2 is an explanatory view showing an example of the case where the tubular membrane electrodes in FIG. 1 are provided in the bath.
Figure 3:
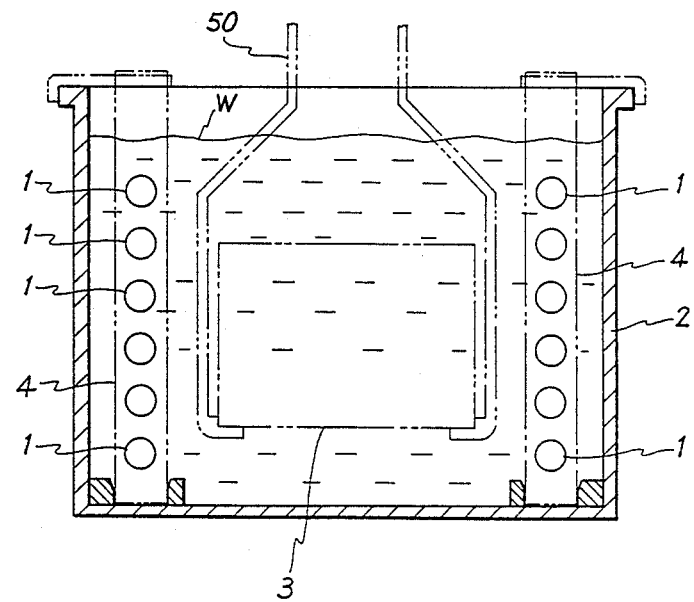
FIG. 3 is a schematic sectional view taken along the line III—III in FIG. 2.

In FIG. 1, designated at 1, 1 . . . are tubularly formed membrane electrodes. As shown in FIGS. 2 and 3, the respective tubular membrane electrodes 1 each being in a general horizontal position, are arranged from below to above along the side surfaces of a bath 2 for the electrodeposition coating. In FIGS. 2 and 3, denoted at 3 is the article to be coated as being an electrode on one side. The tubular membrane electrodes 1 form the electrodes on the other side in association with the article to be coated 3 as being one of the electrodes.

Figure 4:
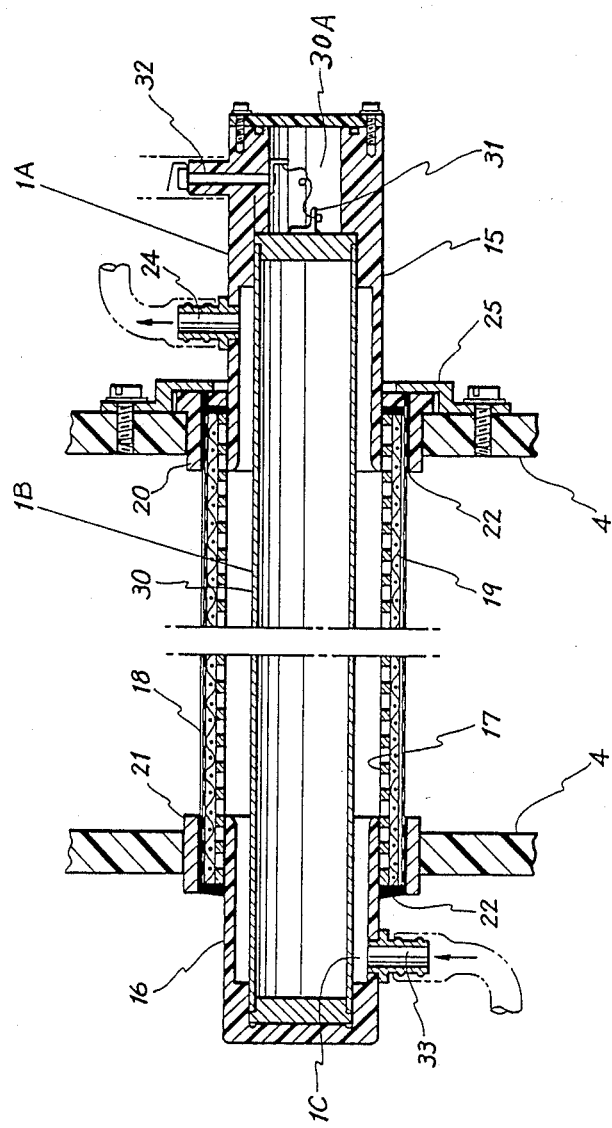
FIG. 4 is a sectional view showing the construction in each of the tubular membrane electrodes shown in FIG. 2.

As shown in FIG. 4, the tubular membrane electrodes 1 forming the electrodes on the other side are engaged with a support frame 4, in the horizontal position.

As shown in FIG. 4, these tubular membrane electrodes 1 each includes a body portion 1A, an electrode portion 1B and a water passing mechanism 1C interposed therebetween.

The body portion 1A includes a first and a second insulating tubes 15 and 16, which are provided on one and the same axis at a given interval, a membrane support member 17 formed on a relatively rigid porous member for connecting these insulating tubes 15 and 16 to each other, a membrane 19 wound around the outer periphery of this membrane support member 17, and an outer cloth 18 further wound around the outer periphery of this membrane 19. As this outer cloth 18, there is used one made of chemical fibers or the like for example, being satisfactorily durable against a tensile force and having the water permeability.

The membrane support member 17 is of a non-conductive screen-shaped member, formed into a relatively long tube and connected at inner sides of opposite end portions thereof to the first and second insulating tubes 15 and 16.

The membrane 19 is formed of an ion-exchange membrane being selectively permeable to ions attracted by the electrode portion 1B. Incidentally, this membrane 19 may be formed of a neutral membrane, i.e. one having no selectivity, preventing relatively large molecules from being permeated therethrough, and allowing small molecules to be permeated therethrough, in addition to the ion-exchange membrane. Since this ion-exchange membrane (or the neutral membrane) is wound around the membrane support member 17 as the membrane 19, the membrane is in a state where the mechanical strength against an external pressure is increased to a considerable extent.

Further, the outer cloth 18 is spirally wound around the outer peripheral surface of this membrane 19 over the entire area as described above, so that satisfactory strength against an internal pressure is added.

As shown in FIG. 1, a first and a second fixing ring members 20 and 21 are provided at a given interval on the outer peripheries of the opposite end portions of the membrane support member 17 wound therearound with the membrane 19 and the outer cloth 18, and, at the same time, the inner diametral sides of these fixing ring members 20 and 21 are filled up with a potting material 22, so that the insulating tubes 15 and 16, the membrane support member 17, the membrane 19 and the outer cloth 18 are simultaneously and firmly integrated with one another. This first ring member 20 is formed into a tubular shape. The second ring member 21 is formed into a tubular shape, the potting material 22 is filled in a state where the membrane support member 17, the insulating tube 16 and the like are inserted into the second ring member 21 as described above, and all of the above members are simultaneously and integrally fixed to one another.

In this embodiment, as the potting material 22, epoxy resin is used, however, urethane resin, phenol resin or the like may be used as well.

Designated at 25 is a housing for fixing the tubular membrane electrode 1 to the support frame 4 through the first ring member 20.

In this embodiment, as the first and second insulating tubes 15 and 16, rigid tubes of vinyl chloride are used. Out of these, the first insulating tube 15 is formed with a water discharge portion 24 as shown in FIG. 4, and an electrode portion 30A is provided at the right end portion thereof.

On the other hand, the electrode portion 1B includes a tubular electrode 30 made of stainless steel, an internal terminal 31 provided on the right end portion of this tubular electrode 30 in FIG. 4, and an external terminal 32 connected to this internal terminal 31. Out of these, the outer diameter of the tubular electrode 30 is smaller than the inner diameter of each of the first and second insulating tubes 5 and 6 of the body portion 1A. Denoted at 33 is a water feed portion provided at the left end portion of FIG. 4. With this arrangement, part of the water passing mechanism 1C is formed between the body portion 1A and the tubular electrode 30.

Figure 5:
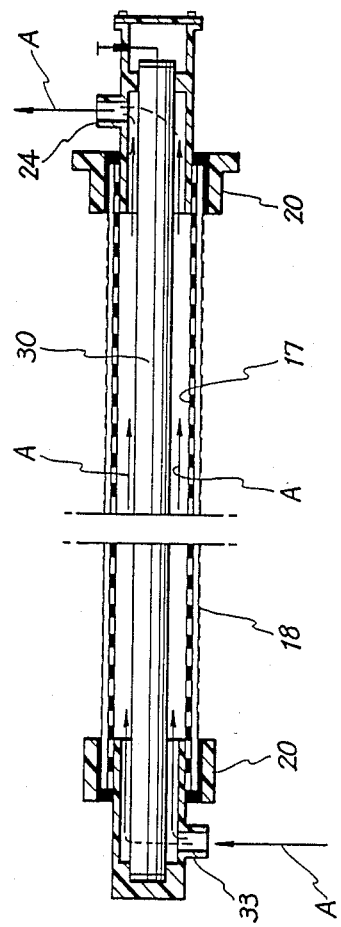
FIG. 5 is an explanatory view of an actuated position of FIG. 4.

The water passing mechanism 1C is to be used for discharging acetic acid and the like, which are accumulated between the membrane 19 and the tubular electrode 30 to the outside, and specifically, includes the above-described electrode portion 1B and the body portion 1A. More specifically, water as a polar liquid which is caused to flow through the water feed portion 33 flows along the outer peripheral side of the tubular electrode 30 as indicated by an arrow A in FIG. 5, i.e. through the inner side of the membrane 19 from the left to the right, and is forced to flow together with the impurities to the outside through the water discharge portion 24.

A power circuit 41 is connected through an on-off switch 40 as being a power on-off means to each of the tubular electrode 30 of the tubular membrane electrodes 1 as shown in FIG. 1. This on-off switch 40 is additionally provided with an on-off control circuit 42 for controlling ON OR OFF of the on-off switch 40, separately of one another. Out of these, the respective on-off control circuits 42 cause the on-off switches 40 to be on-off operated on the basis of the results of calculations in an operation control section 43. Denoted at 44 is a memory section. This memory section 44 stores the procedures of calculations by the operation control section 43 and instructs the same, and further, outputs pattern control data and the like, which are required in association with information set and inputted by an information input section 45.

In this case, from the information input section 45, instructions are inputted to the tubular membrane electrodes 1 to operate every other one of these tubular membrane electrodes 1 in accordance with the shape of the article 3 to be coated, and instructions are inputted to the tubular membrane electrodes 1 provided at the upper potion or the lower portion to operate all of the tubular membrane electrodes 1. Incidentally, designated at 5 in FIGS. 2 and 3 is a hanger and W a solution for the electrodeposition coating.

As described above, in this embodiment, the tubular membrane electrodes are transversely provided from below to above as aforesaid, whereby the field areas in the vertical direction in the bath are desirably divided into a plurality of layers. Because of this, in this embodiment, it becomes possible that the tubular membrane electrodes at the upper portion and the lower portion are provided at positions close to the article to be coated in accordance with the shape of the article to be coated, so that a generally uniform coating film as a whole can be formed on the article to be coated.

In this embodiment, for example, every other one of the tubular membrane electrodes at the central portion in FIG. 3 can be released from the power circuit. Through the utilization of this, the field strength to the central portion at the side surface where the coating film tends to be thickened is set weakly (every other one of the on-off switches 40 are turned off), on the other hand, the field strength of the upper portion and the lower portion, where the coating film is relatively thinned may be set stronger than the central portion of the side surface (all of the on-off switches 40 are turned on). Even with this arrangement, similarly to the case of the movable provision of the tubular membrane electrodes which will be described hereunder, the article to be coated can be applied thereon with the generally uniform coating film as a whole, thus proving advantageously economical.

Figure 6:
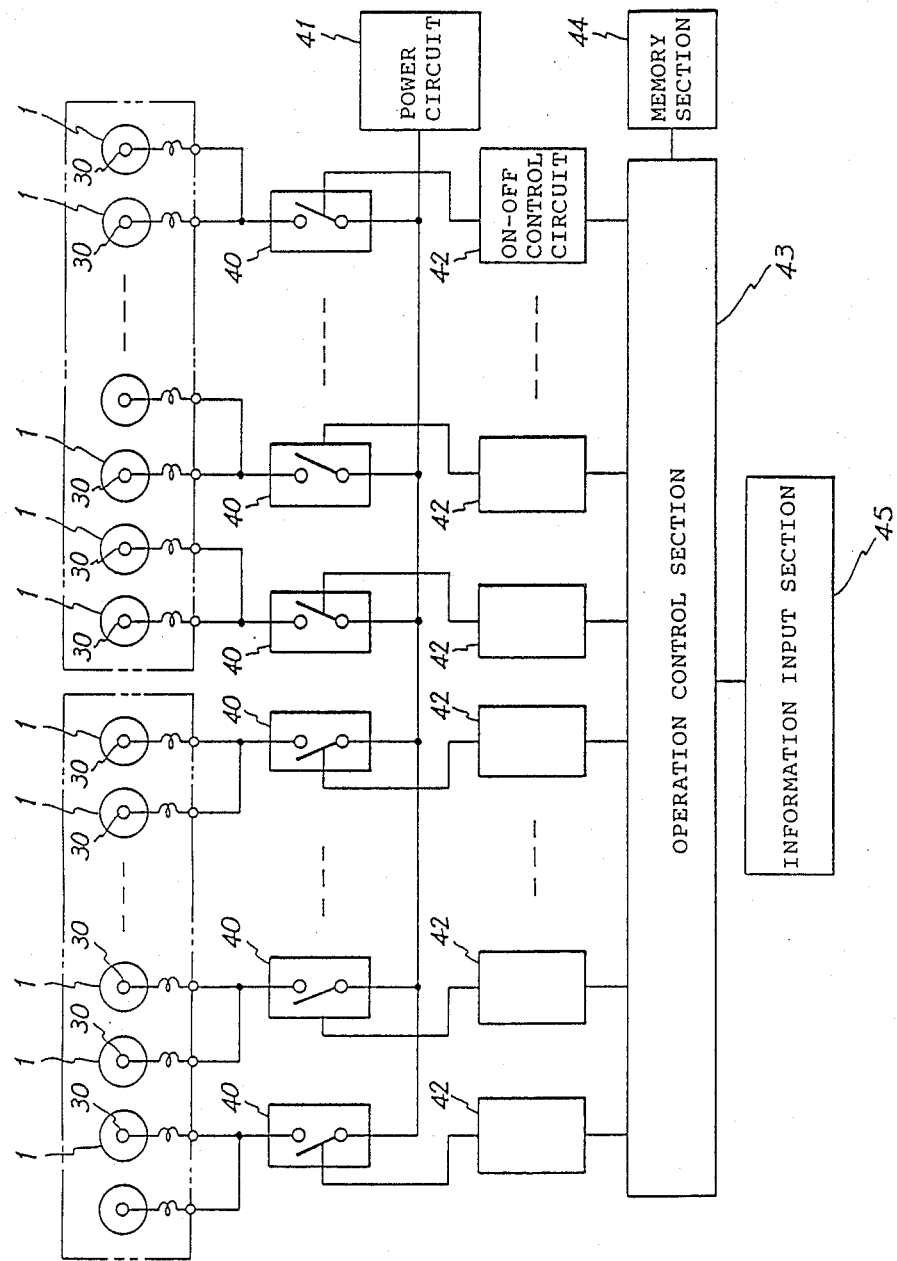
FIGS. 6 and 7 are block diagrams showing modifications of FIG. 1.
Figure 7:
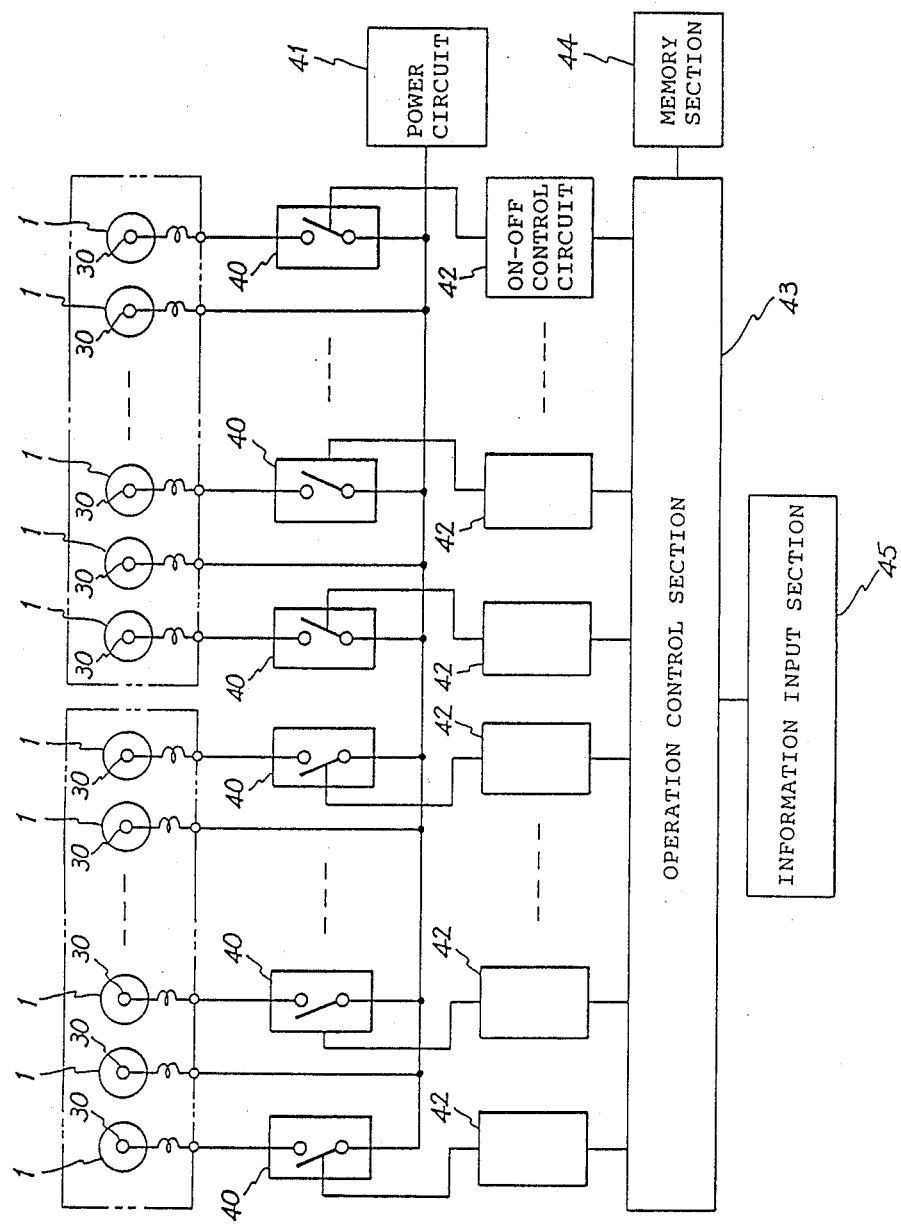

Incidentally, FIGS. 6 and 7 show modifications of FIG. 1. Out of these, in the circuit shown in FIG. 6, the respective tubular membrane electrodes 1, 1, . . . , are divided into a plurality of pairs of conductive groups, each of the groups being provided with an on-off switch 40. Furthermore, a circuit in FIG. 7 is constructed such that on-off switches 40 are provided on part of the tubular membrane electrodes 1, 1, . . . , i.e. every other one of the tubular membrane electrodes 1 shown in FIG. 7. These are each used in association with the shape and quantity of the article to be coated and the required degree of the thickness of coating, thus proving to be generally equal functional effects.

One embodiment of the second aspect of the present invention will hereunder be described with reference to FIG. 8. Same reference numerals are used to designate same or similar parts corresponding to ones as shown in FIG. 1, so that the description will be omitted or simplified.

The second aspect of the present invention features that an output voltage regulating means for variably setting a voltage applied to the tubular membrane electrode to a desirable value is additionally provided on the tubular membrane electrode. The used tubular membrane electrodes and the like are similar in arrangement to those in the embodiment of the first aspect of the present invention.

Figure 8:
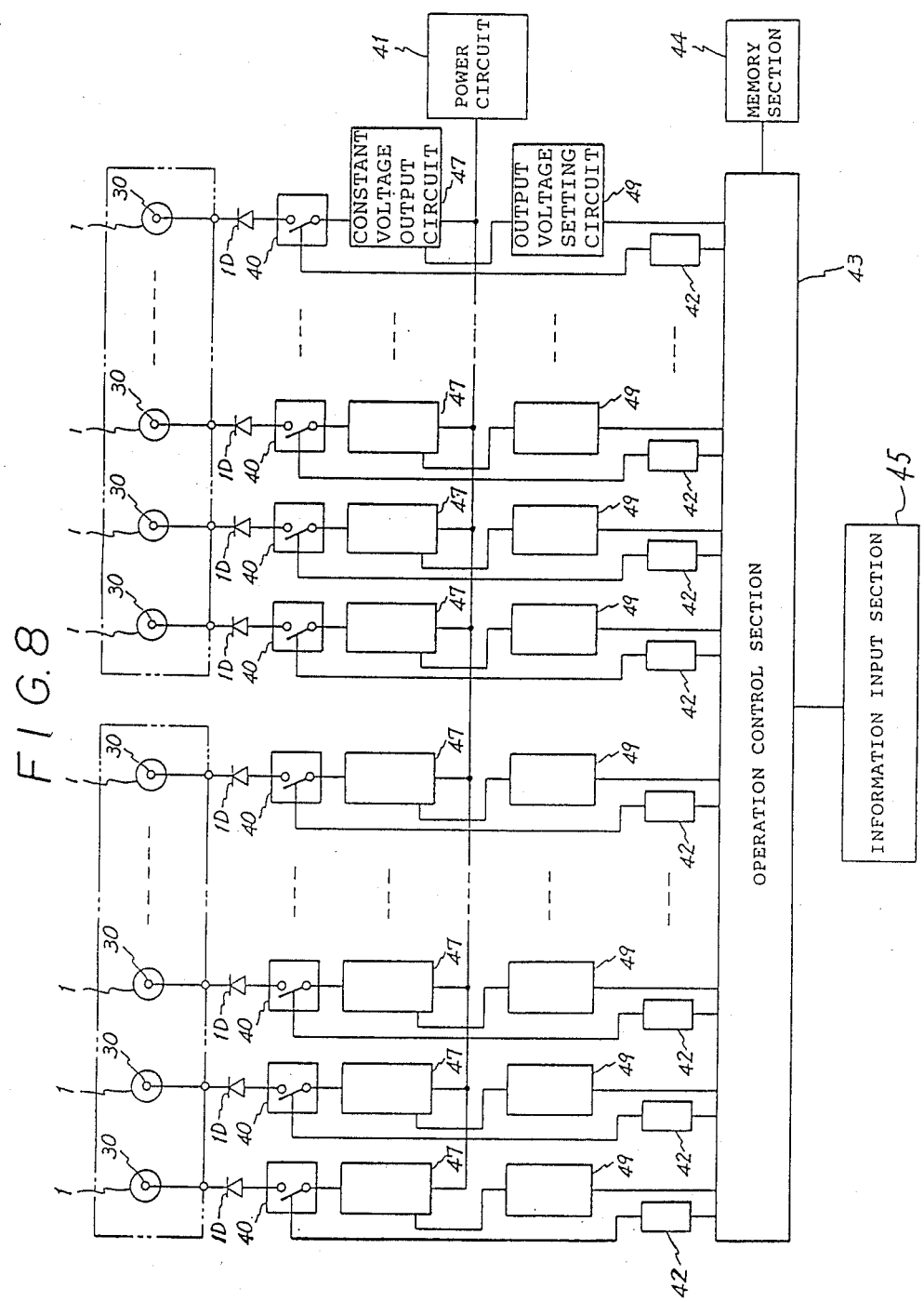
FIG. 8 is a block diagram showing one embodiment of a second aspect of the present invention.

In FIG. 8, non-return diodes 10 are interposed between the tubular membrane electrodes 1 and the on-off switches 40, respectively, and a constant voltage output circuit 47 is additionally provided with an output voltage setting circuit 49 for energizing the circuit 47. This output voltage setting circuit 49 and the constant voltage output circuit 47 constitute an output voltage regulating means. This output voltage setting circuit 49 has a function of outputting a reference voltage for the constant voltage output circuit 47. This reference voltage is determined in value by the operation control section 43 in response to information outputted from the memory section 44.

In this case, from the information input section 45, such pattern instructing information is to be inputted that voltages of the level of 50% off of the voltage applied to the tubular membrane electrodes 1 provided at the upper portion and the lower portion are applied to the tubular membrane electrodes 1 provided at the central portion.

For this, in this embodiment, the level of the voltages outputted from the tubular membrane electrodes 1 can be partially freely set in accordance with the article to be coated, whereby the disadvantage of the coating film at specific portions becoming thick can be obviated, thus advantageously proving to be economical.

FIGS. 9(1) and 9(2) show the action of the non-return diode 1D. In this case, there are shown the cases where high voltages ($H_1$, $H_2$, $H_3$ and $H_4$) are applied to the two pairs of the tubular membrane electrodes 1 positioned at the top and the bottom ends through the agency of the operation control section 43, while, low voltages ($L_1$, $L_2$, $L_3$, $L_4$ and $L_5$) are applied to the other tubular membrane electrodes 1. In FIGS. 9(1) and 9(2), in the case of FIG. 9(1), where the non-return diode 1D is not provided, the field $V_5$ as being a turn-in phenomenon occurs from the tubular membrane electrodes $H_2$ and $H_3$, to which high voltages are applied, toward the tubular membrane electrodes $L_1$ and $L_5$, to which are low voltages are applied. Due to this field $V_5$, a current flows from the electrodes on the side of the high voltage to the aforesaid tubular membrane electrodes $L_1$–$L_5$ on the side of the low voltage as indicated by an arrow of a dotted line, the electrodes of $L_1$–$L_5$, particularly, $L_1$ and $L_5$ are electrodeposited thereon with the coating material, and, because of this, such disadvantages are presented that the membranes are lowered in performance, agglomerates of the coating material are generated and soon.

In contrast thereto, in FIG. 9(2), the field $v_5$ acts from the tubular membrane electrodes $H_2$ and $H_3$ on the side of the high voltage only to the tubular membrane electrodes $L_1$ and $L_5$ on the side of the low voltage adjacent thereto through the agency of the non-return diode FID. With this arrangement, the field strength of $L_1$ and $L_5$ out of the tubular membrane electrodes on the side of the low voltage is raised by a value v, however, no influence is rendered to the other tubular membrane electrodes $L_2$–$L_4$ on the side of the low voltage at all.

Because of this, a coating film having a thickness generally equal to the thickness originally planned can be formed on the side surfaces of the article 3 to be coated, the side surfaces being opposed to the tubular membrane electrodes $L_1$–$L_5$ on the side of the low voltage.

Figure 10:
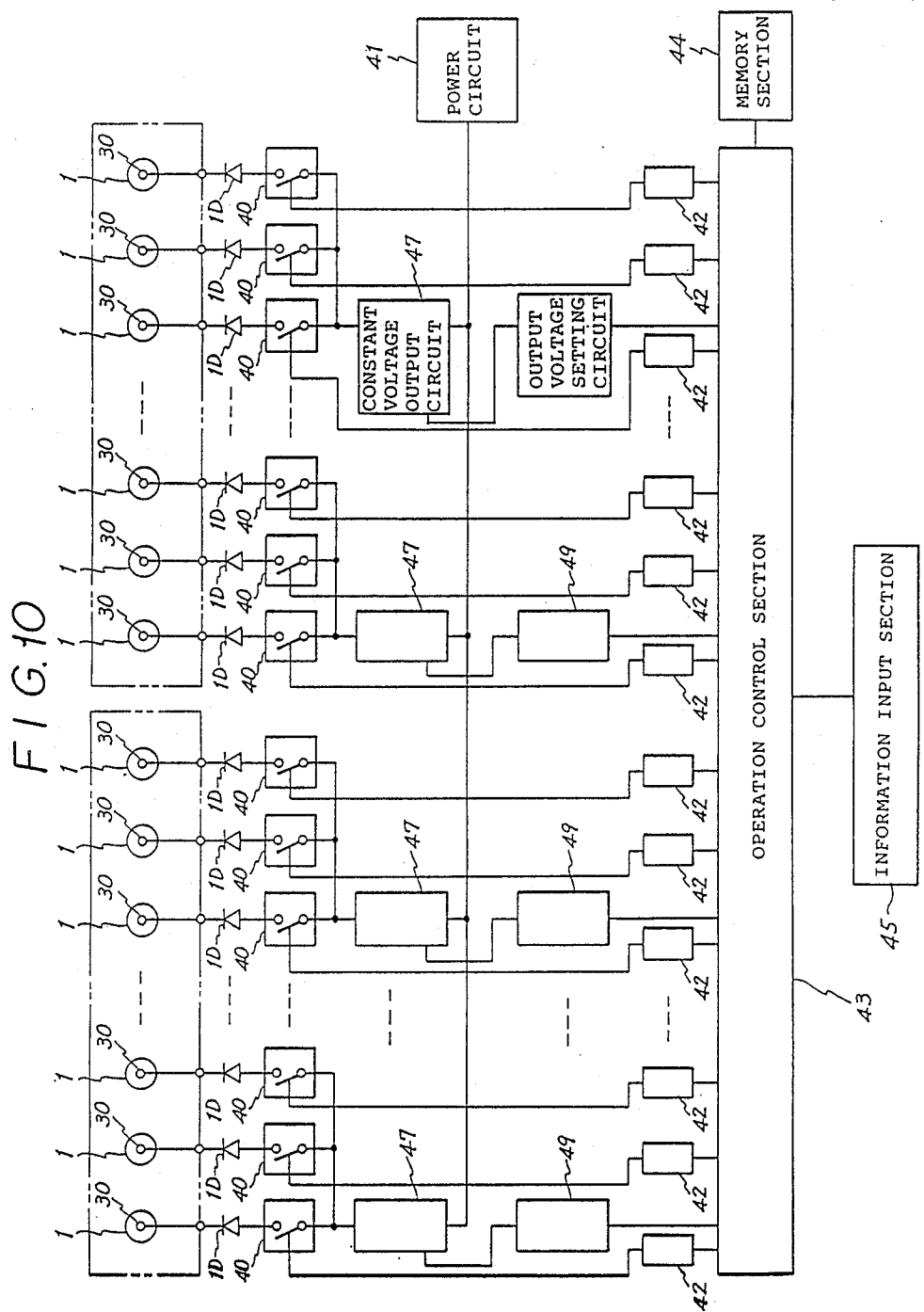
FIG. 10 is a block diagram showing a modification of FIG. 8.

FIG. 10 shows the example of use of the aforesaid modification illustrated in FIG. 8. The circuit shown in FIG. 10 is obtained by forming the tubular membrane electrodes 1, the non-return diode 1D and the on-off switches 40 into one set, three such sets are formed into a group and such groups are divided into a plurality of conductive groups. The output voltage regulating means 47 is provided for each of these groups. Even the one shown in FIG. 10 is used in association with the shape and quantity of the article 3 to be coated and the degree of the coating film, thus achieving the functional effects generally equal to the aforesaid case shown in FIG. 1.

Figure 11:
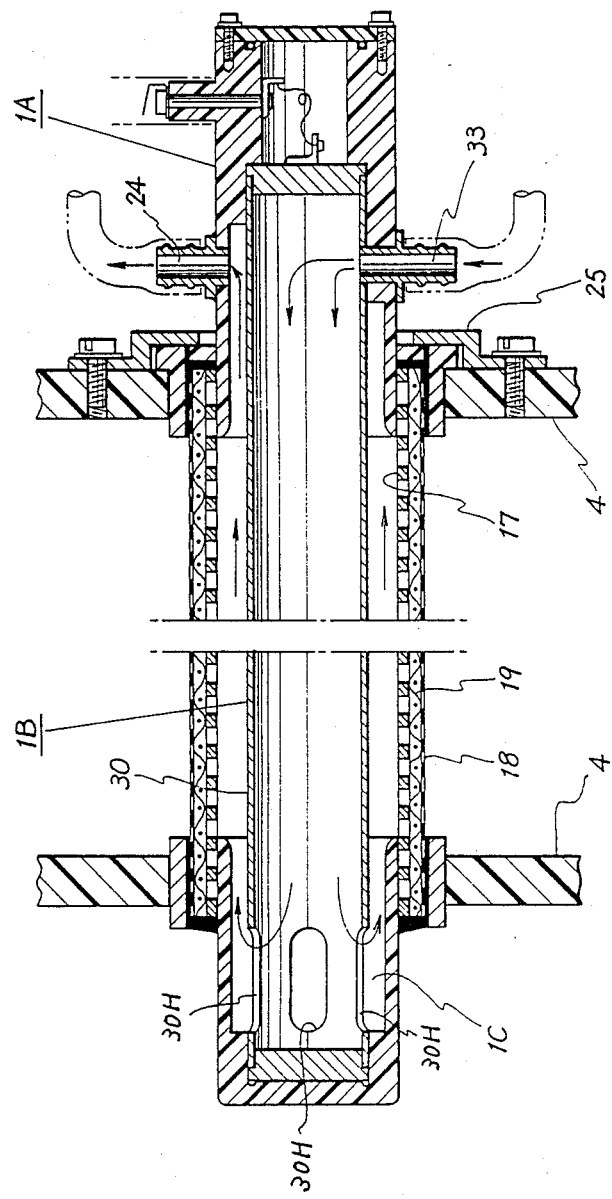
FIG. 11 is a sectional view showing a modification of the tubular membrane electrode.
Figure 12:
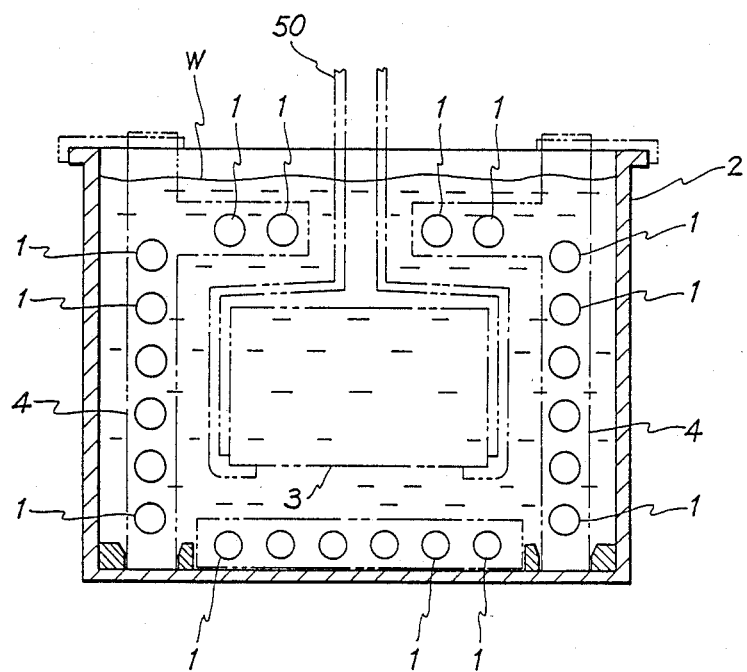
FIGS. 12 to 15 are explanatory views showing other arrangements of the tubular membrane electrodes.

Incidentally, the tubular membrane electrodes 1 in the respective embodiments described above need not necessarily be limited to the arrangement shown in FIG. 4, and such an arrangement may be adopted that, as shown in FIG. 11, the water feed portion 33 is provided at a position close to the water discharge portion 24 for example. More specifically, in the tubular membrane electrode 1 shown in FIG. 11, the water feed portion 33 is communicated with the interior of the tubular electrode 30, the water supplied flows through the tubular electrode 30 from the right to left in FIG. 11, moves out from the through-hole 30H to the outer periphery of the tubular electrode 30, i.e. to the side of the membrane support member 17, flows to the right in the drawing through the interior of the membrane 18, and discharged to the outside through the water discharge portion 24.

Because of this, since the water feed portion 33 and the water discharge portion 24 are provided at the same position, the maintenance thereof can be advantageously easy. The other functional effects are generally identical with the tubular membrane electrode shown in FIG. 4.

Incidentally, in the above embodiment, the case where the voltage applying circuit is provided with the on-off switches 40, the on-off switch control circuit 42 and the non-return diode 1D is particularly exemplified, however, these members should be provided when necessary. Even when these members are not provided, the object of the present invention can be achieved satisfactorily.

As for the mode of arranging the tubular membrane electrodes 1 in the bath 2, the examples of arrangement as shown in FIGS. 12 to 15 for example may be selected. More specifically, the case of FIG. 12, differing from the aforesaid case of FIG. 3, features that the tubular membrane electrodes 1 are installed on the top surface and the bottom surface to surround the article 3 to be coated.

Figure 13:
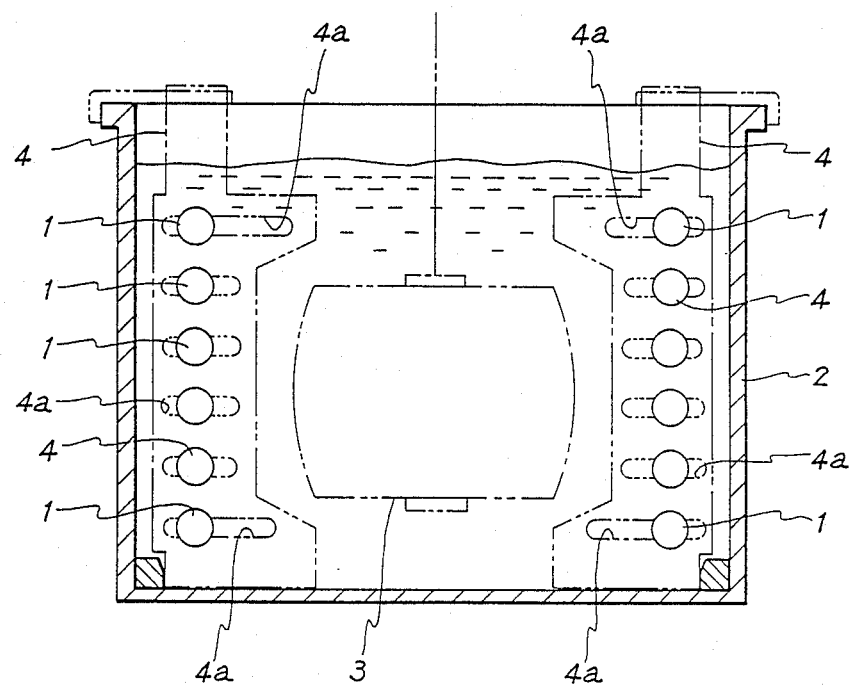

The one shown in FIG. 13 is of such an arrangement that the tubular membrane electrode 1 is movable to the right and left in FIG. 13 along a guide slot for sliding, which is formed on the support frame 4 thereof and fixable. This FIG. 13 shows the case where the tubular membrane electrodes are fixed in a row in the vertical direction.

Because of this, the one shown in FIG. 13 can offer such advantages that the fixed positions of the tubular membrane electrodes 1 can be shifted in accordance with the shape of the surfaces of the article 3 to be coated, on which the coating film is formed, whereby the tubular membrane electrodes 1 can be provided at the optimal positions corresponding to the shapes of the articles 3 to be coated, so that the substantially uniform coating film can be applied generally.

Figure 14:
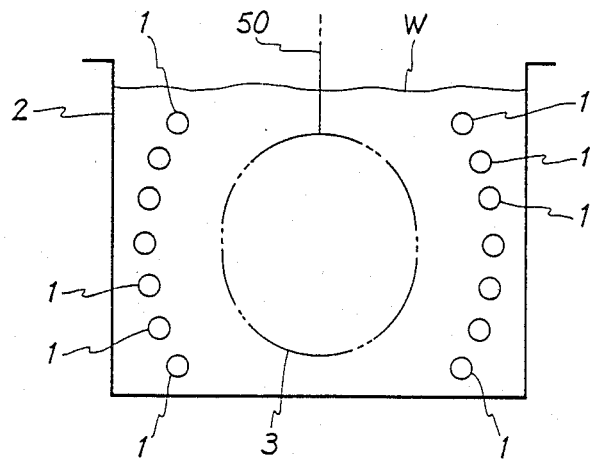
Figure 15:
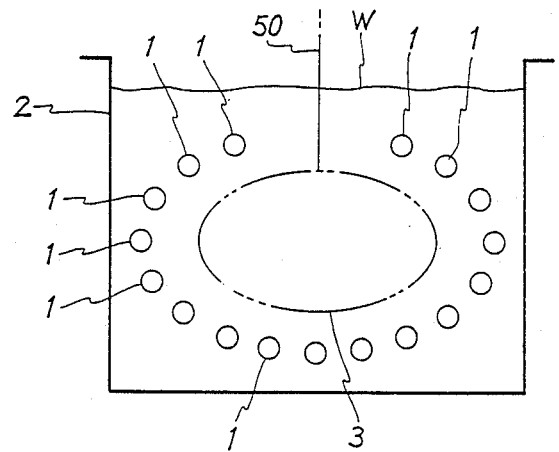

FIGS. 14 and 15 show the further examples of the case where the tubular membrane electrodes are arranged in accordance with the shape of the article 3 to be coated. Out of these, FIG. 14, shows the case where the tubular membrane electrodes are arranged in a circularly arcuate shape, and FIG. 15 shows the case where the tubular membrane electrodes are arranged in an elliptical shape.

If a suitable one is selected from these examples of arrangement, then the coating having a uniform thickness can be achieved in cooperation with the regulation of the output voltage and so on.

Further, the tubular membrane electrode 1 includes a polygonal shape, an elliptical shape and other shapes, in addition to the cylindrical shape.

The present invention with the arrangement and the functions as described above can provide an unprecedented outstanding electrodeposition coating system wherein, for example, every other one of the tubular membrane electrodes provided at the portion where the coating film is formed in thickness beyond necessity, can be operated through the agency of the power on-off means additionally provided on the tubular membrane electrodes, and the intensity of the applied voltage can be varied in accordance with the distance to the article to be coated through the agency of the output voltage regulating means 47, whereby the thickness of the coating film can be uniformly formed over the entire surface, so that the economics can be improved due to reduced consumption of the coating material, thus improving the productivity of the articles to be coated.

What is claimed is:

1. An electrodeposition coating system for coating an article immersed in a film forming paint solution, said system comprising:
    a bath for containing the film forming paint solution;
    a plurality of membrane electrodes disposed in said bath in a horizontal direction and arranged from below to above along the side surfaces of said bath; and
    a power circuit connected to said membrane electrodes, said power circuit having means for executing a power on-off switching function operable on selected groupings of the membrane electrodes.

2. A system as recited in claim 1, wherein the means for executing the power on-off switching function comprises a plurality of power on-off switching means, each of said plurality of power on-off switching means operable on one of said plurality of membrane electrodes.

3. A system as recited in claim 1, wherein said plurality of membrane electrodes are divided into a plurality of conductive groups, wherein the means for executing the power on-off switching function comprises a plurality of power on-off switching means, and wherein each of said plurality of power on-off switching means is operable on one of said plurality of conductive groups.

4. A system as recited in claim 1, wherein the means for executing the power on-off switching function comprises a plurality of power on-off switching means, wherein said plurality of power on-off switching means numbers less than said plurality of membrane electrodes, and wherein each of said plurality of power on-off switching means is operable on one of said plurality of membrane electrodes.

5. A system as recited in claim 1 further comprising a support frame having portions defining a plurality of guide slots, and wherein said plurality of membrane electrodes are slideably positioned in said guide slots so as to be adjustably positioned.

6. An electrodeposition coating system for coating an article immersed in a film forming paint solution, said system comprising:
   a bath for containing the film forming paint solution;
   a plurality of membrane electrodes disposed in said bath in a horizontal direction and arranged from below to above along the side surfaces of said bath;
   a power source; and
   a power circuit connecting said power source to said plurality of membrane electrodes, said power circuit being adapted to selectively provide different voltages to different membrane electrodes.

7. A system as recited in claim 6, wherein said power circuit includes a plurality of means for regulating output voltage, and wherein each of said plurality of means for regulating output voltage is operable on one of said plurality of membrane electrodes.

8. A system as recited in claim 6, wherein said plurality of membrane electrodes are divided into a plurality of conductive groups, wherein said power circuit includes a plurality of power on-off switching means, and wherein each of said plurality of power on-off switching means is operable on one of said plurality of conductive groups.

9. A system as recited in claim 6, wherein the article to be coated is transferred in said bath in a predetermined direction, and wherein said membrane electrodes are arranged in a sectional shape perpendicularly intersecting the direction of transfer of the article to be coated generally equidistantly.

10. A system ss recited in claim 6, wherein each of said plurality of membrane electrodes has a conductive circuit, which conductive circuit includes a non-return diode.

11. A system as recited in claim 6, further comprising a plurality of non-return diodes, said plurality of non-return diodes serially connected to each of said plurality of membrane electrodes.

12. A system as recited in claim 6, wherein each of said plurality of membrane electrodes has a low voltage side, and wherein the system further comprises a plurality of non-return diodes, each of said non-return diodes being separately connected in circuit on the low voltage side of each individual membrane electrode.

13. A system as recited in claim 6 further comprising a support frame having portions defining a plurality of guide slots, and wherein said plurality of membrane electrodes are slideably positioned in said guide slots so as to be adjustably positioned.

14. An electrodeposition coating system for coating articles shaped so that distance between electrodes and the article to be coated generally varies vertically, said system comprising:
   a system for creating a vertical variable potential field, said system comprising:
   a bath; and
   a plurality of membrane electrodes horizontally disposed in said bath and arranged from below to above along the side surfaces of said bath.

15. An electrodeposition coating system as recited in claim 14, wherein said system for creating a vertically variable potential field further comprises a power circuit connected to said membrane electrodes, said power circuit having means for executing a power on-off switching function operable on selected groupings of the membrane electrodes.

16. An electrodeposition coating system as recited in claim 15, wherein the means for executing the power on-off switching function comprises a plurality of power on-off switching means, and wherein each of said plurality of power on-off means is operable on one of said plurality of membrane electrodes.

17. An electrodeposition coating system as recited in claim 15, wherein said plurality of membrane electrodes are divided into a plurality of conductive groups, wherein the means for executing the power on-off switching function comprises a plurality of power on-off switching means, and wherein each of said power on-off switching means is operable on one of said plurality of conductive groups.

18. A system as recited in claim 15, wherein the means for executing a power on-off switching function comprises a plurality of power on-off switching means, and wherein said plurality of power on-off switching means numbers less than said plurality of membrane electrodes, and wherein each of said plurality of power on-off switching means is operable on one of said plurality of membrane electrodes.

19. A system as recited in claim 14, further comprising a support frame having portions defining a plurality of guide slots, and wherein said plurality of membrane electrodes are slideably positioned in said guide slots so as to be adjustably positioned.

* * * * *

UNITED STATES PATENT AND TRADEMARK OFFICE
CERTIFICATE OF CORRECTION

PATENT NO. : 4,851,102

DATED : July 25, 1989

INVENTOR(S) : Akito INOUE

It is certified that error appears in the above-identified patent and that said Letters Patent is hereby corrected as shown below:

First page, line 30, change Foreign Application Priority Date No. from "62-210553" to ---62-201553---.

At column 2, line 53, change "position ally" to ---positionally---.

At column 9, line 41, change "ss" to ---as---.

Signed and Sealed this

Twenty-fifth Day of June, 1991

Attest:

HARRY F. MANBECK, JR.

Attesting Officer

Commissioner of Patents and Trademarks